US012531581B2

(12) United States Patent
Poulin

(10) Patent No.: US 12,531,581 B2
(45) Date of Patent: Jan. 20, 2026

(54) DYNAMIC SIGNAL PROCESSING CONFIGURATION FOR MULTILINK OPERATION

(71) Applicant: SKYWORKS SOLUTIONS, INC., Irvine, CA (US)

(72) Inventor: Grant Darcy Poulin, Carp (CA)

(73) Assignee: SKYWORKS SOLUTIONS, INC., Irvine, CA (US)

( * ) Notice: Subject to any disclaimer, the term of this patent is extended or adjusted under 35 U.S.C. 154(b) by 0 days.

(21) Appl. No.: 18/515,542

(22) Filed: Nov. 21, 2023

(65) Prior Publication Data
US 2024/0235591 A1 Jul. 11, 2024

Related U.S. Application Data

(60) Provisional application No. 63/478,601, filed on Jan. 5, 2023.

(51) Int. Cl.
H04B 1/04 (2006.01)

(52) U.S. Cl.
CPC ......... H04B 1/0475 (2013.01); H04B 1/0458 (2013.01)

(58) Field of Classification Search
CPC .... H04B 1/0475; H04B 1/0458; H04B 1/525; H04B 1/401; H04B 1/0064; H04B 1/123; H04B 1/44; H04B 1/50
USPC .......................... 375/219–220, 346, 348–350
See application file for complete search history.

(56) References Cited

U.S. PATENT DOCUMENTS

| 9,306,618 | B2 * | 4/2016 | Charlon | H04B 1/525 |
| 9,520,985 | B2 | 12/2016 | Choi et al. | |
| 11,671,129 | B2 * | 6/2023 | Choi | H04B 1/0475 375/350 |
| 11,695,201 | B2 * | 7/2023 | Wloczysiak | H04B 1/0057 343/702 |
| 2011/0171922 | A1 * | 7/2011 | Kim | H04B 1/525 455/307 |
| 2012/0094617 | A1 * | 4/2012 | Tone | H04B 1/525 455/78 |

(Continued)

OTHER PUBLICATIONS

Hong et al., "Applications of Self-Interference Cancellation in 5G and Beyond," 5G Wireless Communcation Systems: Prospects and Challenges, IEEE Communications Magazine, Feb. 2014, pp. 114-121.

Primary Examiner — Emmanuel Bayard
(74) Attorney, Agent, or Firm — Lando & Anastasi, LLP

(57) ABSTRACT

Aspects and elements of this disclosure relate to a Front End Module comprising: an input; a filter; a noise cancellation circuit including a plurality of programmable taps that can be dynamically programmed to determine one or more frequency bands for which the noise cancellation circuit provides noise cancellation dependent upon whether the FEM is operating in a transmit mode of operation or a receive mode of operation, and further based on a proximity of the one or more frequency bands for which the noise cancellation circuit provides noise cancellation to a frequency band associated with the transmit mode of operation or the receive mode of operation; and a summing node coupled between the filter, noise cancellation circuit, and receive node, and configured to sum the output of the filter and the noise cancellation circuit.

20 Claims, 10 Drawing Sheets

(56) References Cited

U.S. PATENT DOCUMENTS

| | | | | |
|---|---|---|---|---|
| 2012/0163245 | A1* | 6/2012 | Tone | H04B 1/525 |
| | | | | 370/277 |
| 2016/0134325 | A1* | 5/2016 | Tageman | H04B 1/525 |
| | | | | 455/83 |
| 2016/0373234 | A1* | 12/2016 | Ju | H04B 7/10 |
| 2017/0054459 | A1* | 2/2017 | Khlat | H04B 1/006 |
| 2017/0222672 | A1* | 8/2017 | Khlat | H04B 1/0057 |
| 2021/0021256 | A1* | 1/2021 | Okada | H03H 9/725 |
| 2021/0050877 | A1* | 2/2021 | Choi | H04B 1/0067 |
| 2021/0336638 | A1* | 10/2021 | Xu | H04B 7/0413 |
| 2022/0038133 | A1* | 2/2022 | Muhammad | H04B 1/525 |
| 2022/0069856 | A1* | 3/2022 | Chen | H03H 15/00 |
| 2023/0077767 | A1* | 3/2023 | Beaudin | H04B 1/006 |
| | | | | 455/552.1 |

* cited by examiner

DYNAMIC SIGNAL PROCESSING CONFIGURATION FOR MULTILINK OPERATION

CROSS-REFERENCE TO RELATED APPLICATIONS

This application claims priority under 35 U.S.C. § 119(e) to U.S. Provisional Patent Application 63/478,601, filed on Jan. 5, 2023, and titled DYNAMIC SIGNAL PROCESSING CONFIGURATION FOR MULTILINK OPERATION, said provisional application being incorporated herein in its entirety for all purposes.

BACKGROUND

Filters are used in telecommunications and other domains to filter electromagnetic signals such as electrical signals. Bulk Acoustic Wave (BAW) filters are commonly used in wireless internet networking technologies such as Wi-Fi and the IEEE 802.11 standards.

SUMMARY

According to at least one aspect of the present disclosure, a front-end-module is provided, to front-end module (FEM) comprising: a first section including a first node, a second node, a first filter, and a first noise cancellation circuit, the first filter and the first noise cancellation circuit being coupled in parallel with one-another between the first node and the second node, the first node being configured to provide a first electrical signal to the first filter and the first noise cancellation circuit, the first filter being configured to produce the first conditioned signal based on the first electrical signal, the first noise cancellation circuit being configured to produce a first cancellation signal based on the first electrical signal, and the second node being configured to receive the first conditioned signal and the first cancellation signal.

In some examples, the FEM further comprises a second section including: a third node; a fourth node; a second filter; and a second noise cancellation circuit, the second filter and the second noise cancellation circuit being coupled in parallel with one-another between the third node and the fourth node, the third node being configured to provide a second electrical signal to the second filter and the second noise cancellation circuit, the second filter being configured to produce a second conditioned signal based on the second electrical signal, the second noise cancellation circuit being configured to produce a second cancellation signal based on the second electrical signal, and the fourth node being configured to receive the second conditioned signal and the second cancellation signal. In some examples, the first electrical signal corresponds to a first frequency band and the second electrical signal corresponds to a second frequency band. In some examples, the first electrical signal corresponds to a 6 GHz frequency band, and the second electrical signal corresponds to a 5 GHz frequency band. In some examples, the first noise cancellation circuit includes a plurality of dynamically programmable taps configured to determine the first cancellation signal. In some examples, the first electrical signal has frequency components in a first frequency band and a second frequency band, and the first noise cancellation circuit produces the first electrical signal such that the first cancellation signal attenuates at least a portion of the frequency components in the second frequency band when summed together in the second node with the first conditioned signal. In some examples, the FEM further comprises an antenna coupled to one of the first node or the second node; and a switch coupled to a different one of the first node or the second node than is coupled to the antenna. In some examples, the FEM further comprises a receive path and a transmit path, wherein the switch has a first terminal coupled to the receive path, a second terminal coupled to the transmit path, and a third terminal configured to be selectively coupled to one of the first terminal and the second terminal. In some examples, the first electrical signal overlaps includes frequency components that overlap with a frequency band of a second electrical signal. In some examples, the first noise cancellation circuit produces the first cancellation signal such that the first cancellation signal attenuates the frequency components that overlap with the frequency band of the second signal near an edge of the frequency band.

According to at least one aspect of the present disclosure, a front-end module is provided, comprising an input configured to transmit and receive wireless telecommunication signals; a filter coupled between the input and a transmit or receive node and configured to filter one or more of the wireless telecommunication signals; a noise cancellation circuit configured to provide noise cancellation to one or more of the wireless telecommunication signals, the noise cancellation circuit being coupled in parallel with the filter between the input and the transmit or receive node, and including a plurality of dynamically programmable taps that can be dynamically programmed to determine one or more frequency bands for which the noise cancellation circuit provides noise cancellation dependent upon whether the FEM is operating in a transmit mode of operation or a receive mode of operation, and further based on a proximity of the one or more frequency bands for which the noise cancellation circuit provides noise cancellation to a frequency band associated with the transmit mode of operation or the receive mode of operation; and a summing node coupled between the filter, noise cancellation circuit, and receive node, and configured to sum the output of the filter and the noise cancellation circuit.

In some examples, the FEM has a plurality of modes of operation including the transmit mode of operation and the receive mode of operation. In some examples, the FEM further comprises a controller configured to set one or more values of the dynamically programmable taps of the plurality of dynamically programmable taps. In some examples, the controller is configured to set the one or more values of the dynamically programmable taps to a first set of values in the transmit mode of operation. In some examples, setting the dynamically programmable taps to the first set of values corresponds to setting the noise cancellation circuit to cancel at least a portion of at least one signal occupying a subset of frequencies near an edge of the frequency band associated with the transmit mode of operation. In some examples, the controller is configured to set the one or more values of the dynamically programmable taps to a second set of values in the receive mode of operation. In some examples, setting the dynamically programmable taps to the second set of values corresponds to setting the noise cancellation circuit to cancel at least a portion of at least one signal occupying a subset of frequencies across the frequency band associated with the receive mode of operation.

According to at least one aspect of the present disclosure a method for filtering signals in a wireless telecommunications device using time domain duplexing (TDD) is presented, the method comprising: receiving a signal on a first frequency band, the signal having frequency components extending into a second frequency band; providing the signal to a filter configured to condition the signal to produce a conditioned signal; providing at least a portion of the signal to a noise cancellation circuit having a plurality of dynamically programmable taps, the noise cancellation circuit being configured to adjust the at least a portion of the signal to produce an adjusted signal; dynamically programming the dynamically programmable taps to have values corresponding to the frequency of the at least a portion of the signal based upon whether the FEM is operating in a transmit mode of operation or a receive mode of operation, and being further based on a proximity of a frequency of the at least a portion of the signal to a frequency band associated with the transmit mode of operation or the receive mode of operation; and summing the conditioned signal and the adjusted signal.

In some examples, providing the at least a portion of the signal to the noise cancellation circuit includes the at least a portion of the signal being within a first range of frequencies, the first range of frequencies being a subset of the frequencies of the signal. In some examples, adjusting the at least a portion of the signal includes at least one of altering the phase of the at least a portion of the signal or altering the amplitude of the at least a portion of the signal.

According to at least one aspect of the present disclosure a front end module (FEM) is disclosed. In some examples, the FEM comprises an input configured to transmit and receive wireless telecommunication signals; a filter coupled between the input and a transmit or receive node and configured to filter one or more of the wireless telecommunication signals; a noise cancellation circuit configured to provide noise cancellation to one or more of the wireless telecommunication signals, the noise cancellation circuit being coupled in parallel with the filter between the input and the transmit or receive node, and including a plurality of programmable taps that can be dynamically programmed to determine one or more frequency bands for which the noise cancellation circuit provides noise cancellation dependent upon whether the FEM is operating in a transmit mode of operation or a receive mode of operation, and further based on a proximity of the one or more frequency bands for which the noise cancellation circuit provides noise cancellation to a frequency band associated with the transmit mode of operation or the receive mode of operation; and a summing node coupled between the filter, noise cancellation circuit, and receive node, and configured to sum the output of the filter and the noise cancellation circuit.

In various examples, the FEM has a plurality of modes of operation including the transmit mode of operation and the receive mode of operation. In some examples, the FEM further comprises a switch having a plurality of terminals including a first terminal coupled to the transmit node, a second terminal coupled to the receive node, and a third terminal coupled to the summing node. In some examples, the FEM further comprises a controller configured to operate the switch to connect the first terminal and third terminal in the transmit mode of operation and to connect the second terminal and the third terminal in the receive mode of operation. In many examples, the FEM further comprises a controller configured to set one or more values of the programmable taps of the plurality of programmable taps. In some examples, the controller is configured to set the one or more values of the programmable taps to a first set of values in the transmit mode of operation. In various examples, setting the programmable taps to the first set of values corresponds to setting the noise cancellation circuit to cancel at least a portion of at least one signal occupying a subset of frequencies near an edge of the frequency band associated with the transmit mode of operation. In many examples, the controller is configured to set the one or more values of the programmable taps to a second set of values in the receive mode of operation. In some examples, setting the programmable taps to the second set of values corresponds to setting the noise cancellation circuit to cancel at least a portion of at least one signal occupying a subset of frequencies across the frequency band associated with the receive mode of operation. In various examples, the filter is a bulk acoustic wave filter. In many examples, the noise cancellation circuit is an analog circuit. In some examples, being an analog circuit means the noise cancellation circuit does not perform any digital processing of the wireless telecommunication signals. In various examples, the input is a first input, the filter is a first filter, the noise cancellation circuit is a first noise cancellation circuit, and the summing node is a first summing node, the FEM further comprising a second input, a second filter coupled between the second input and a second summing node, a second noise cancellation circuit coupled in parallel with the second filter between the second input and the second summing node, and a transmit node coupled to the second summing node. In some examples, the transmit node is a second transmit node, the FEM further comprising a first transmit node coupled to the first summing node via a first switch, the first switch being configured to selectively couple the first transmit node and the first receive node to the first summing node, a second receive node coupled to the second summing node via a second switch, the second switch being configured to selectively couple the second transmit node and the second receive node to the second summing node, and wherein when the first transmit node is coupled to the first summing node via the first switch, the second transmit node is not coupled to the second summing node via the second switch.

According to at least one aspect of the present disclosure, a method for filtering signals is disclosed. In some examples, the method of filtering signals in a wireless telecommunications device using time domain duplexing (TDD) comprises receiving a signal on a first frequency band, the signal having frequency components extending into a second frequency band; providing the signal to a filter configured to condition the signal to produce a conditioned signal; providing at least a portion of the signal to a noise cancellation circuit having a plurality of programmable taps, the noise cancellation circuit being configured to adjust the at least a portion of the signal to produce an adjusted signal; dynamically programming the programmable taps to have values corresponding to the frequency of the at least a portion of the signal based upon whether the FEM is operating in a transmit mode of operation or a receive mode of operation, and being further based on a proximity of a frequency of the at least a portion of the signal to a frequency band associated with the transmit mode of operation or the receive mode of operation; and summing the conditioned signal and the adjusted signal.

In some examples, the method further comprises selecting a mode of operation from among a plurality of modes of operation, the plurality of modes of operation including the transmit mode of operation and the receive mode of operation. In various examples, providing the at least a portion of the signal to the noise cancellation circuit includes the at least a portion of the signal being within a first range of frequencies, the first range of frequencies being a subset of the frequencies of the signal. In many examples, adjusting the at least a portion of the signal includes at least one of altering the phase of the at least a portion of the signal or altering the amplitude of the at least a portion of the signal. In some examples, programming the dynamically programmable taps includes setting the values of the dynamically programmable taps to determine a band of frequencies from which the noise cancellation circuit will sample the at least a portion of the signal. In various examples, neither the filter nor the noise cancellation circuit convert the signal or the at least a portion of the signal to digital form.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1:
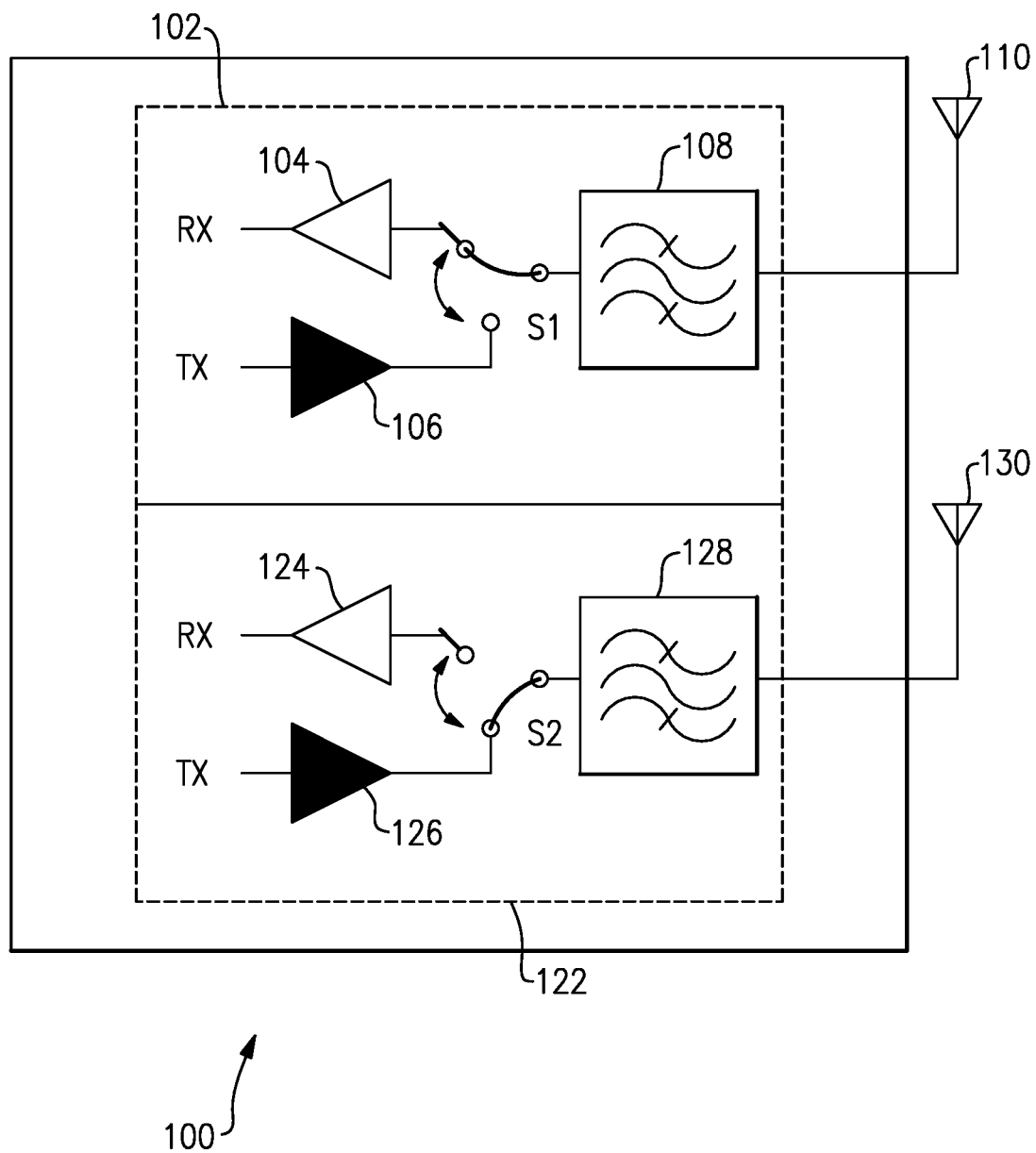
FIG. 1 illustrates an RF front end module (FEM) according to an example.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

In wireless communication technologies, time domain duplexing (TDD) and frequency domain duplexing (FDD) are techniques used to facilitate transmitting and receiving data. In TDD, data is transmitted and received sequentially. For example, in TDD data may be first transmitted and then received, but will not be transmitted and received simultaneously. By contrast, FDD allows data to be transmitted and received simultaneously, typically by using two different frequencies to transmit data. The Wi-Fi standards use TDD rather than FDD. For example, Wi-Fi 6 and the upcoming Wi-Fi 7 are TDD. However, the Wi-Fi 7 standard requires that devices be "multilink" capable, where two separate frequency bands, often in close proximity, must operate as independent TDD radios. Since the two TDD bands are independent, there is no coordination between the adjacent bands, and there are often cases where one band is transmitting while the other is simultaneously receiving. In some senses, the Wi-Fi 7 multilink requirement requires that Wi-Fi 7 devices operate more like an FDD device than a TDD device.

Multilink support poses significant problems. For one thing, when transmitting and receiving simultaneously or near simultaneously, the transmitting signal can interfere with the receiving signal. Additionally, antennas for transmission and reception can be located close together, either being proximate on the same device or due to multiple devices being in proximity to one another while individually trying to transmit and/or receive at the same time. When antennas are in close proximity to each other, RF signals can couple between them, resulting in strong interference.

One solution to the interference problem is to have a device listen for another device or signal, and then have the device choose a different channel or time to transmit data, thus reducing interference. However, this solution is inefficient because it requires devices to wait and listen for opportunities to transmit, instead of simply transmitting on demand. Multilink requires that both devices are capable of transmitting in one band while simultaneously receiving in another band, and this can lead to significantly higher data throughput.

This disclosure provides, in at least one aspect and embodiment, an efficient means of sharing spectrum in a TDD (or FDD) system to facilitate multilink functionality as required by the Wi-Fi 7 standard. A filter is commonly used to filter the transmit and receive signals of a device. The filter is used to suppress close-in out of band noise that appears adjacent to the desired signal when used on the transmitter, and to suppress the large out of band blocking signal caused by an adjacent transmitter when used on the receiver. Achieving the required filter rejection can be very challenging. This disclosure discusses how we can use a noise cancellation circuit to cancel signal noise appearing in the receive band due to the transmit signal, and to cancel the large out of band signal appearing in the receive band due to the transmit signal. In some examples, the filter and the noise cancellation circuit are configured in parallel to one another. In various examples, the noise cancellation circuit is programmable so that the precise characteristics of the noise cancellation circuit can be adjusted. The net effect of the filter and noise cancellation circuit is, in some examples, to create a "black box" circuit that operates as or like a configurable filter. In various embodiments, the disclosed systems and methods are cheaper and more efficient than comparable filtering systems.

FIG. 1 illustrates an RF front end 100 for a telecommunications device. The RF front end 100 comprises 2 RF front end modules (FEM). The FEM 102 (first section 102) has a first receive node 104, a first transmit node 106, a switch S1, a first filter 108, and a first antenna 110. The FEM 122 (second section 122) has a second receive node 124, a second transmit node 126, a switch S2, a second filter 128, and a second antenna 130. As shown, the switches S1, S2 are in a position where the first FEM 102 is receiving a signal on the first receive node 104, and the second FEM 122 is transmitting a signal on the second transmit node 126.

The first section 102 may be designed to receive and transmit on a first range of frequencies different from the range of frequencies on which the second section 102 is designed to receive and transmit on. For example, the first section 102 may be configured for 5 GHZ signals on a band ranging from 5.17 GHz to 5.835 GHZ, while the second section 122 may be configured for 6 GHz signals on a band ranging from 5.945 GHz to 7.125 GHz. The respective transmit and receive nodes 104, 106, 124, 126 operate to receive and transmit signals to and from the respective antennas 110, 130. The respective filters 108, 128 operate to filter signals being transmitted or received. In some examples, the switches S1, S2 are configured such that when one antenna is transmitting the other is receiving. That is, when the first section 102 is switched such that the first receive node 104 is coupled to the first filter 108 via the switch S1, the second section 122 will be switched such that the second transmit node 126 is coupled via the second switch S2 to the second filter 128. That is, in some examples, whenever one switch is coupling the filter to a receive node, the other switch is coupled the filter to a transmit node.

In the foregoing discussion, in some examples, the receive nodes 104, 124 include and/or are low noise amplifiers (LNAs). The transmit nodes 106, 126 include and/or are power amplifiers (PAS).

In general, filters 108, 128 are used in both transmit and receive operation for each of the sections 102, 122. However, the transmit and receive modes of operation have substantially different filtering requirements. The particular filtering requirements of each mode will be discussed in greater detail below, as will techniques for achieving optimal filtering characteristics and performance in both transmit and receive modes. In the following discussion, the operation of the filters discussed herein will be referred to by the term "condition," as in "condition the signal." Condition means at least attenuating the signal and/or modifying the phase of the signal, and may include the term "filtering" as well.

Figure 2:
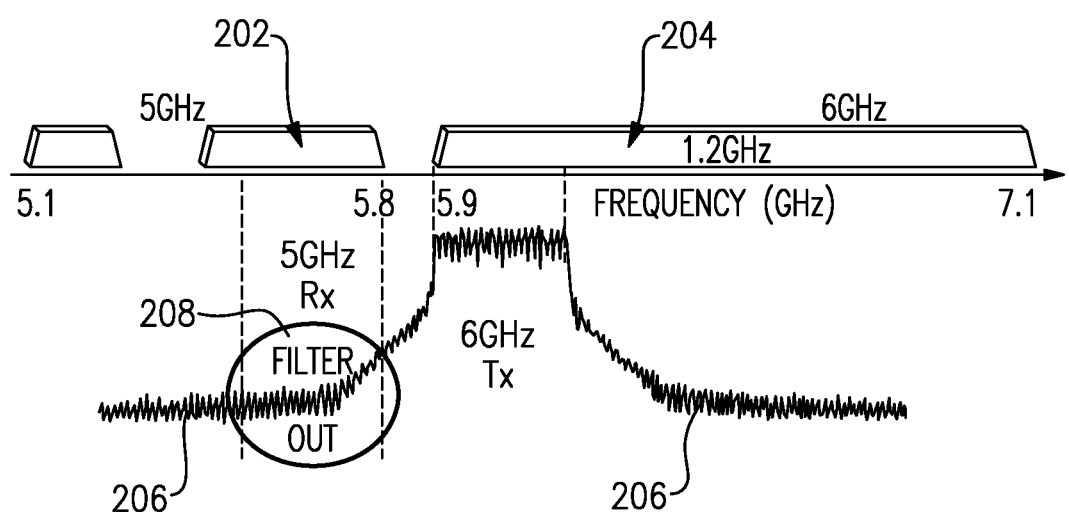
FIG. 2 illustrates transmission interference on respective frequency bands related to the FEM according to an example.

FIG. 2 illustrates transmission interference on the respective frequency bands of the first section 102 and the second section 122 when the second section 122 is in a transmit mode of operation. FIG. 2 shows a first frequency band 202 corresponding to the first section 102 in a receive mode of operation, and a second frequency band 204 corresponding to the second section 122 in a transmit mode of operation. The first trace 206 shows components, such as frequency components, of the transmit signal from the second section 122 across the frequency spectrum. The first trace 206 represents the energy of the transmit signal from the second section 122 across the various frequencies. The filter region 208 indicates a region where it is desired to filter out or otherwise remove or reduce the energy (i.e., the components) of the transmit signal.

As FIG. 2 illustrates, the transmission from the second section 122 appears as wide-band noise to the receive node 104 of the first section 102. This noise will be referred to as out-of-band noise (OOB noise). The OOB noise can be caused by many different factors, including non-linearities in power amplifiers or other amplifiers in the FEM 100. The magnitude of the OOB noise is high at the band edge of the desired receive signal at 5.8 GHZ, but falls off rapidly as the trace moves away from 5.8 GHz towards 5.1 GHZ, though this is an example and the center frequency can be any frequency in either direction. As a result, large amounts of filtering can be necessary near the edge of the transmit frequency channel, the channel being the subset of frequencies at which no or little attenuation or filtering is desired within the frequency band of a given section 102, 122, but less filtering is required as the frequency components are further from the center frequency and edge.

As a result, in transmit mode (i.e., when the second section 122 is transmitting), it is desirable to provide a substantial amount of filtering within the filter region 208 to eliminate the OOB noise produced by the transmit signal. The filtering of the transmit signal is desirable to perform in the transmit path of the second section 122 to eliminate the OOB noise before it is received by another antenna, such as the first antenna 110. The filtering and/or noise cancellation process to accomplish the filtering discussed herein will be discussed in greater detail with respect to FIGS. 6 and 7.

With respect to FIG. 2, "near the edge of the transit frequency channel" is a relative term, but has a clear definition. In some examples, "nearness" is determined by regulatory bodies defining the frequency ranges and channels for wireless signal transmission. For example, per federal regulation in the United States, the 6 GHz transmit signal (i.e., the first trace 206 must be placed in a frequency band of 5.945 to 5.965 GHZ, and the receive trace (e.g., the second trace 210 of FIG. 3) must be placed in the 5.815 to 5.835 GHz frequency band. Another measure of "nearness" can be obtained by considering the various tones that make up the transmit and/or receive signals. The OOB noise can be caused by intermodulation of the various tones that make up the transmit and/or receive signals. Intermodulation occurs when a non-linear device is present (e.g., when a power or low noise amplifier is not operating in the linear range—for example, when such a device clips). Thus, when intermodulation occurs, a frequency band can be considered "near." Another metric of "nearness"—related to the issue of intermodulation—is that a frequency within +/−160 MHz of a given frequency or frequency band can be considered near, with each further 160 MHz distance from the frequency and/or frequency band being considered progressively less near.

Figure 3:
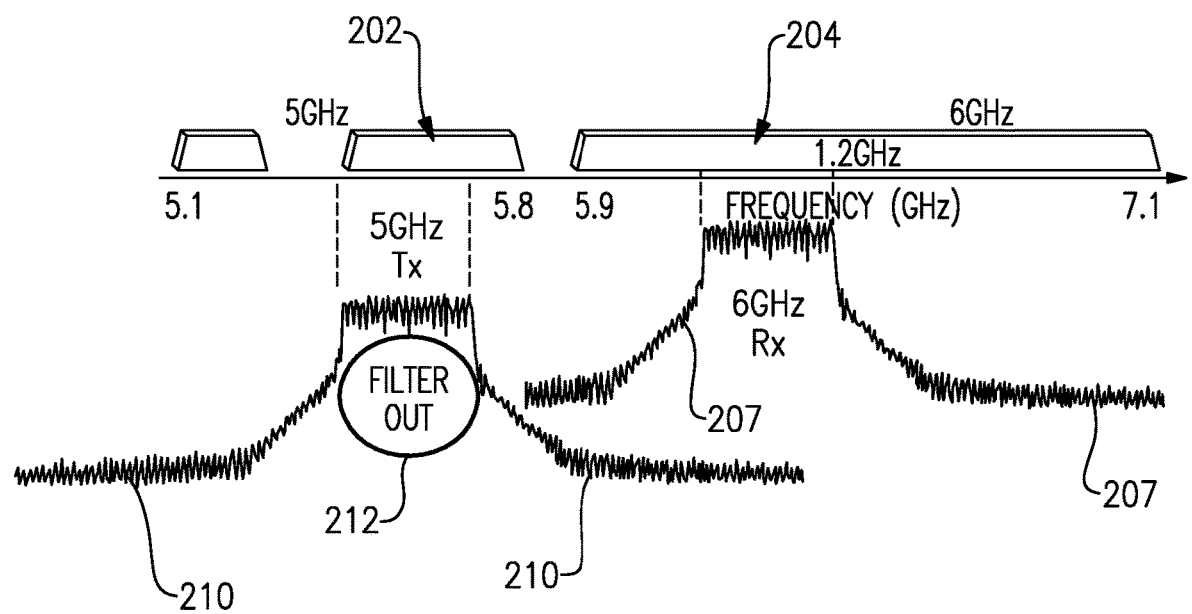
FIG. 3 illustrates signal interference when at least a portion of the FEM is in a receive mode of operation according to an example.

FIG. 3 illustrates a second case showing signal interference when the second section 122 is in a receive mode of operation. In this mode of operation, the first section 102 transmits a signal, represented by a second trace 210. The second trace 210 shows components of the first section 102 transmit signal—for example, showing the energy of the transmit signal at various frequencies. The first section 102 transmit signal appears as a large out-of-band jammer (OOB jammer) to the second section 122 receive node 124, and this large signal can cause the LNA 104 to operate in a non-linear manner, thus degrading system performance. The third trace 207 has a center frequency closer to 6.3 GHZ in this example, compared to the first trace 206. Like with the transmit mode case, it is now desirable to filter the first section 102 transmit signal components that appear on the second section 122 receive node 126 path.

FIGS. 2 and 3, taken together, illustrate that an ideal filter for an FEM (such as FEM 100) is a filter that provides large amounts of close-in rejection (large amounts of filtering and/or attenuation near the edge of the transmitter frequency band) when the second section 122 is in transmit mode, and at least moderate amounts of filtering across the entire frequency band of the first section 102 when the second section 122 is in receive mode.

Figure 4:
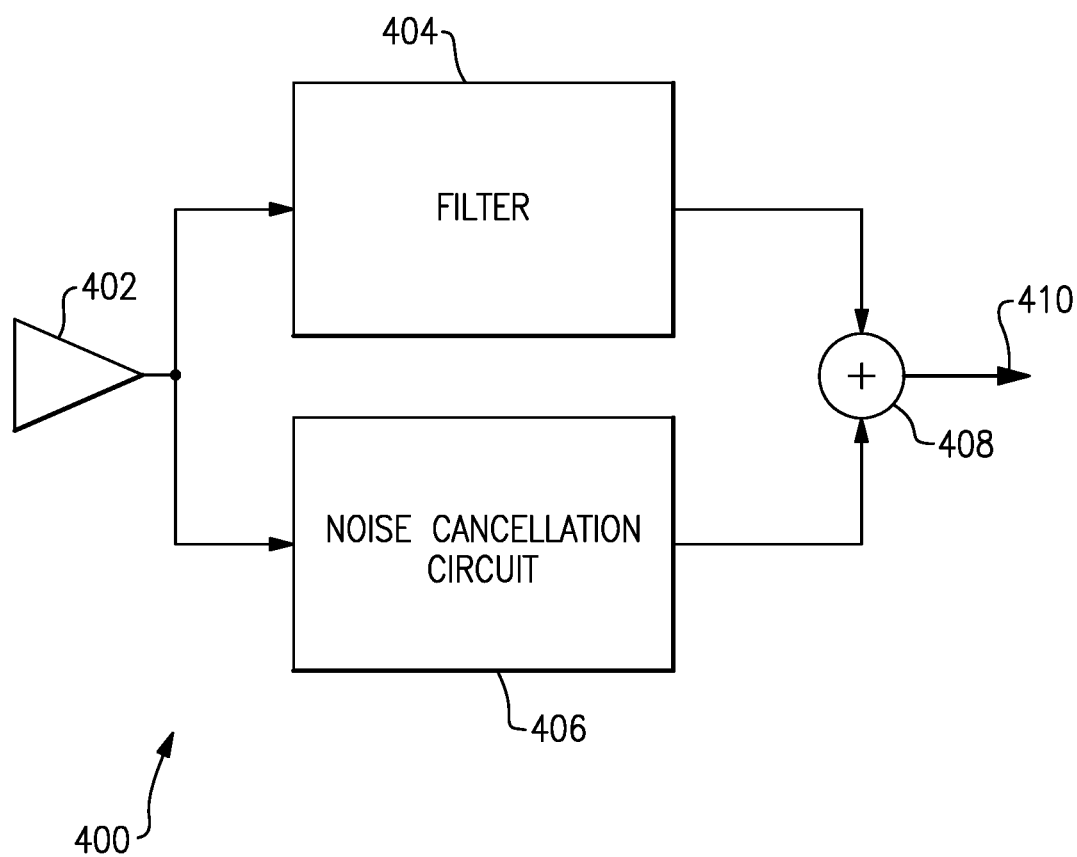
FIG. 4 illustrates an example filtering circuit according to an example.

FIG. 4 illustrates an example of a Filtering Circuit 400 according to an example. Filtering circuit 400 includes an input 402, a filter 404, a noise cancellation circuit 406, a summing node 408, and an output 410. The filtering circuit 400 can be configured to provide ideal or close-to-ideal filtering characteristics for a FEM, as described above.

Figure 5A:
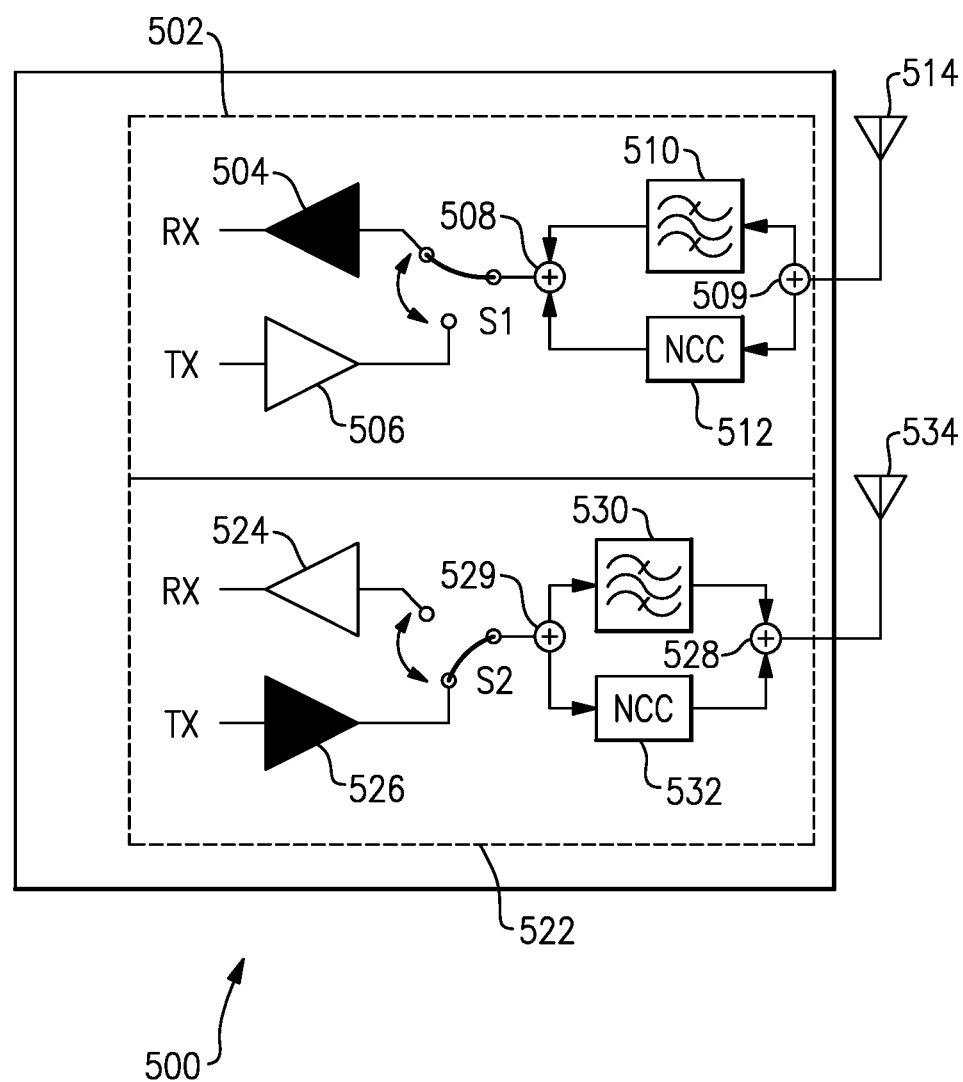
FIG. 5A illustrates a FEM in a transmit mode of operation according to an example.
Figure 5B:
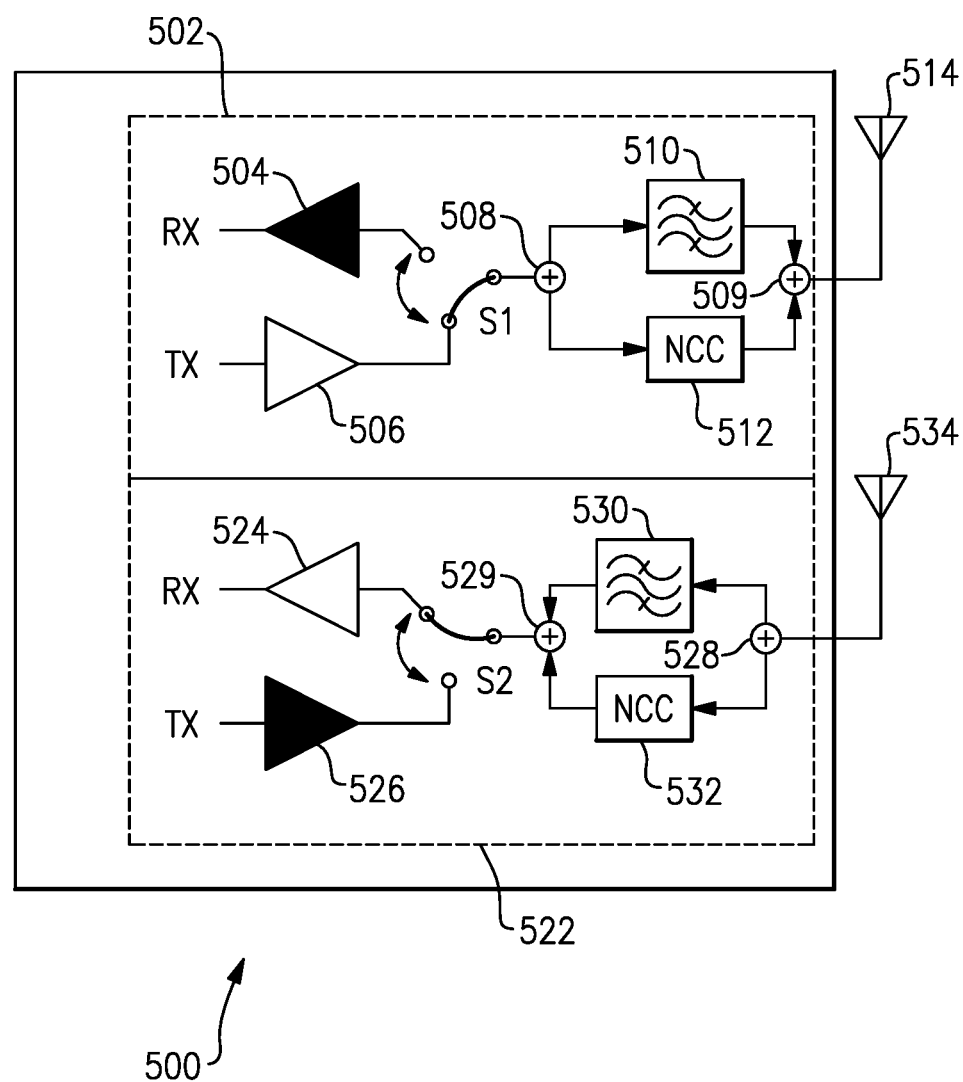
FIG. 5B illustrates a FEM in a receive mode of operation according to an example.

The filtering circuit 400 may be oriented so that the output 410 is coupled to an antenna or coupled to an transmit or receive node (e.g., the transmit nodes 106, 126 and receive nodes 140, 124). FIGS. 5A and 5B will show both orientations with respect to the respective sections 502, 522 of an FEM 500.

The input 402 is coupled to the filter 404 and the noise cancellation circuit 406. The input 402 is configured to receive an input signal and to provide at least a portion of the input signal to the filter 404 and the noise cancellation circuit 406. The input signal may come from anywhere, including an antenna or a receive node. In some examples, the filter 404 receives the entire input signal and the noise cancellation circuit 406 receives at least a portion of the input signal corresponding to a desired frequency range for which noise cancellation is to be performed. The summing node 408 is coupled to the output 410, the filter 404, and the noise cancellation circuit 406. The summing node 408 is configured to sum the outputs of the filter 404 and the noise cancellation circuit 406, and to provide the summed output to the output 410 as an output signal.

The filter 404 may be any kind of filter. In preferred embodiments, the filter 404 is a bulk acoustic wave (BAW) filter. BAW filters are filters that convert electrical energy into acoustic or mechanical energy, such as by using a piezoelectric material. BAW filters can operate at high frequencies and are suitable for telecommunication technologies. In some examples, the filter 404 is a bandpass filter. In some examples, the filter 404 is a high pass or a low pass filter. In some examples, the filter 404 may be any type of filter.

The noise cancellation circuit 406 is a circuit configured to receive at least a portion of the input signal and adjust the phase and magnitude of the portion of the input signal received. The noise cancellation circuit 406 has programmable taps, so that the portion of the input signal that it cancels can be adjusted. In some examples, the programmable taps may be controlled (e.g., programmed) by a controller, and the controller may control the taps digitally. Control of the noise cancellation circuit 406 can be performed using analog or digital methods. In some examples the noise cancellation circuit 406 is an analog circuit, meaning that the process of cancelling noise and/or filtering a signal is carried out using analog components and methods. In examples where the noise cancellation circuit 406 is analog, the noise cancellation circuit 406 may still be controlled digitally (e.g., the programmable taps may still be set to desired values using a controller such as a processor).

The frequency range of the portion of the input signal that the noise cancellation circuit 406 cancels can be adjusted to a desired frequency range based, at least, on the operation mode (transmit or receive) of the FEM the filtering circuit 400 is deployed to, and—in some examples—the attenuation and/or gain provided by the noise cancellation circuit 406 to the input signal can also be adjusted. In some examples, the noise cancellation circuit 406 adjusts the phase of the portion of the input signal by 180 degrees and applies a non-zero gain (i.e., −30 dB, −20 dB, −10 dB, and so forth) to the portion of the input signal. The noise cancellation circuit 406 may adjust the phase of the portion of the input signal by any amount, and may apply any gain coefficient to the signal.

One example of a noise cancellation circuit using digital methods is U.S. Pat. No. 9,520,895 titled "Low Power Analog to Digital Converter," which is hereby incorporated by reference in its entirety for all purposes.

In some examples, the filter 404 is a static filter and its filtering characteristics cannot be adjusted. In some cases, this is because a BAW filter (if the filter 404 is implemented as a BAW filter) is generally a static component with characteristics that are set when fabricated. The inability to easily or cheaply adjust the BAW filter means that the filter 404 does not provide a convenient means of filtering the portions of the transmit signals discussed in FIGS. 2 and 3. Furthermore, the transmit and receive modes require filtering of signal components at substantially different frequencies from one another. In FIG. 2, the filtering region 208 (corresponding to the second section 122 transmitting a signal) is located near the edge of the first section 102 frequency band. By contrast, in FIG. 3, the filtering region 212 is located much further away from the edge of the third trace 207. As a result, a filter suitable to filter the first filtering region 208 may not be capable of suitably filtering the second filtering region 212, and a filter able to suitably filter the second filtering region 212 may not be able to suitably filter the first filtering region 208.

However, the filtering circuit 400 can provide a solution that allows a single circuit to filter effectively for both cases described in FIGS. 2 and 3—that is, the filtering circuit 400 can suitably and effectively filter both the first and second filtering regions 208, 212. By summing the output of the noise cancellation circuit 406 and the filter 404 at the summing node 408, the filtering circuit 400 can act like a configurable BAW filter or other filter.

The filter 404 applies filtering to the entirety of the input signal and provides the filtered signal to the summing node 408. The programmable taps of the noise cancellation circuit are set (e.g., programmed by a controller or other device) such that a desired portion of the input signal (corresponding to a frequency band of the input signal) is processed by the noise cancellation circuit 406. The noise cancellation circuit 406 adjusts the phase and gain of the portion of the input signal to produce a noise cancellation signal and provides the noise cancellation signal to the summing node 408.

Figure 6:
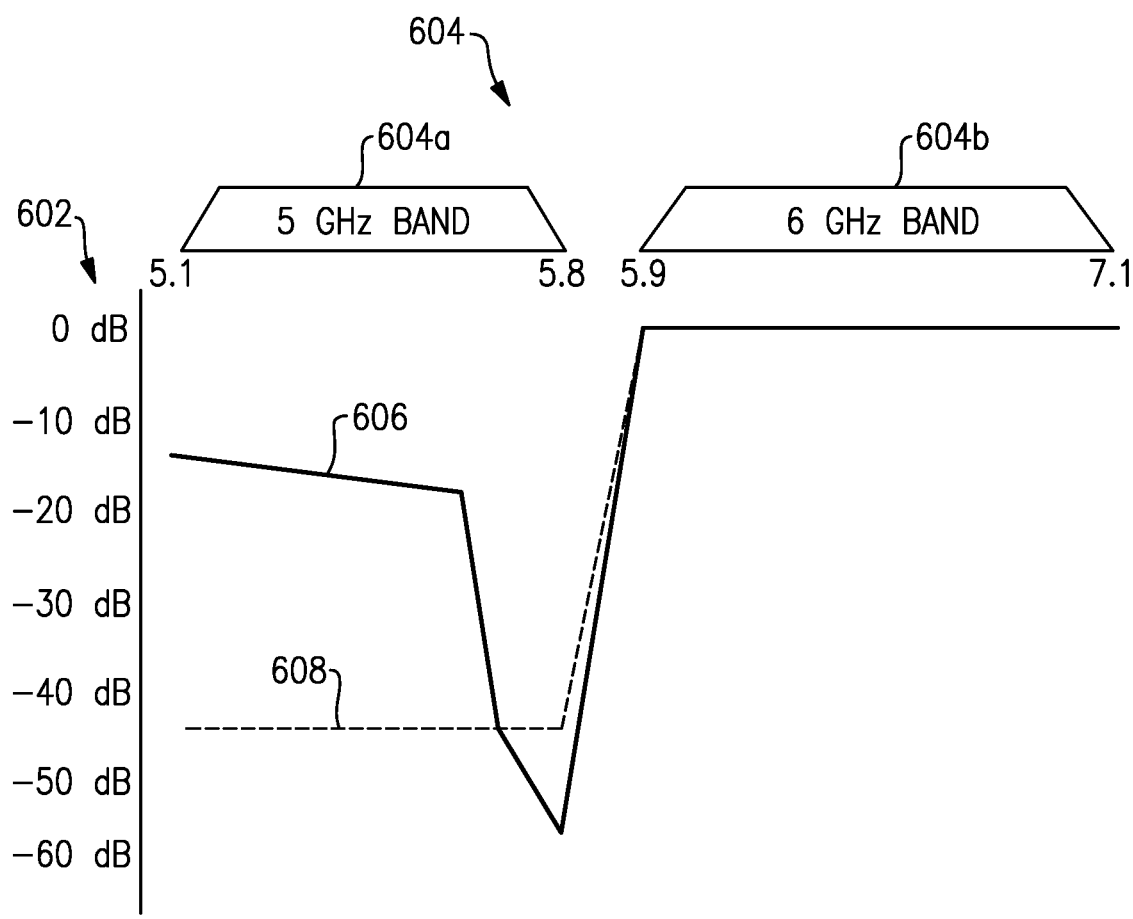
FIG. 6 illustrates a graph of the effective filtering characteristics of a FEM according to an example.

When the noise cancellation signal is summed together at the summing node 408 with the filtered signal provided by the filter 404, the noise cancellation signal eliminates a portion of the filtered signal corresponding to the noise cancellation signal. In some examples, the portion of the input signal used to produce the noise cancellation signal by the noise cancellation circuit 406 is a portion of the input signal corresponding to the signal to be filtered in the filter regions 208, 212 of FIGS. 2 and 3. FIGS. 5A, 5B, and 6 will discuss the filtering process in more detail.

FIG. 5A illustrates an FEM 502 (first section 502 in a transmit mode and FEM 522 (second section 522) in receive mode of operation according to an example. The FEMs 502 and 522 are similar to those of FIG. 1, but incorporates the summing node, filter, and noise cancellation circuit of FIG. 4. The FEMs 502 or 522 are therefore able to operate akin to a FEM having a configurable filter.

The FEM 502 includes a first receive node 504, a first transmit node 506, a switch S1, a first summing node 508, a first filter 510, a first noise cancellation circuit 512 ("first NCC 512"), and a first antenna 514. The FEM 522 includes a receive node 524, a transmit node 526, a switch S2, a second summing node 528, a second filter 530, a second noise cancellation circuit 532 ("second NCC 532") and a second antenna 534. The transmit and receive nodes 504, 506, 524, 526 may be and/or include power amplifiers (PAs) and low noise amplifiers (LNAs).

The RF front end 500 operates in a similar manner to the RF front end 100. The first section 502 corresponds to a first range (or band) of frequencies, and the second section 522 corresponds to a second range (or band) of frequencies. The switches S1, S2 select which mode of operation the sections 502, 522 are in. Section 502 and 522 are independent, so they can both be in transmit mode, they can both be in receive mode, or one can be in transmit mode and the other in receive mode. The most challenging Simultaneous Transmit and Receive (STR) case occurs when one section is transmitting while the second section is simultaneously receiving.

In one STR instance, the second section 522 is set to transmit signals to a distant device and the first section 502 is set to receive signals from a distant device. Transmit signals originating from the second transmit node 526 may interfere with receive signals for the first section 502. For example, assuming the second section 522 transmits on a second frequency band of around 6 GHZ and the first section 502 receives on a first frequency band of around 5 GHz, signal components of the transmit signal from the second section 522 will interfere with the 5 GHz band, effectively operating as noise and raising the noise floor in the 5 GHz band. As a result, the first section 502 (which is receiving signals) may not be able to receive some portion of signals received on the 5 GHz band (or the signals may be lost in the noise created by the transmit signal). Accordingly, noise that might fall on the 5 GHz band from the 6 GHZ transmitter (i.e., the second section 526) must be filtered out before being transmitted. Furthermore, noise is the worst when the transmit signal on the 6 GHz band is near the 5 GHZ band in frequency, and thus a significant amount of close-in rejection (e.g., 50 dB, 60 dB, 100 dB, and so forth) near the upper edge of the 5 GHz frequency band is desirable.

To prevent or reduce interference on the 5 GHz band, the transmit signal (originating from the second transmit node 526) passes to the second filter 530 and the second NCC 532. The second filter 530 filters the transmit signal in some uniform, generally static manner. For example, if the second filter 530 is a high pass filter, low frequencies will be conditioned and high frequencies will pass through the filter. The precise characteristics of the filtering provided by the second filter 530 will depend on the design of the second filter 530.

In parallel with the second filter 530, the second NCC 532 samples a portion of the transmit signal. Because close-in rejection is desired, a controller may program the programmable taps of the second NCC 532 to receive and provide attenuation to a range of frequencies near the upper edge of the 5 GHz band (or, stated more generally, the first frequency band). The second NCC 532 will then receive the portion of the transmit signal, adjust the phase and/or amplitude of the portion of the transmit signal, and provide the portion of the transmit signal to the second summing node 528.

At the second summing node 528, the two signals from the second filter 530 and second NCC 532 are summed together. To better understand what this entails, consider the following example: suppose the second filter 530 provides 40 dB of attenuation to frequencies below the second frequency band (e.g., the 6 GHz band). This means the close-in rejection from just the second filter 530 will be about 40 dB. The second NCC 532 samples the transmit signal components corresponding to the edge of the first frequency band (e.g., the edge of the 5 GHZ band closest to the 6 GHz band). The second NCC 532 adjusts the portion of the transmit signal so that it is conditioned by 40 dB as well, and then inverts the signal (i.e., either by applying a 180 degree phase shift or a gain coefficient of −1). The second NCC 532, by doing the foregoing operations, has effectively produced a signal of equal but opposite magnitude to the transmit signal after the transmit signal has passed through the second filter 530. When the filtered signal from the filter 530 and the noise cancellation signal from the second NCC 532 are summed together, the frequency components of the filtered signal in the close-in rejection frequency band are summed with the noise cancellation signal which corresponds to those frequency components, but has the opposite magnitude, and thus the portions of the filtered signal in the close-in rejection frequency band are reduced to zero (akin to destructive interference of the noise cancellation signal with the close-in rejection frequency band components of the filtered transmit signal).

In real or actual operation of the second filter 530 and second NCC 532, the close-in frequency bands will not be completely eliminated, and some attenuation of other parts of the filtered transmit signal may occur. The transmit signal is then transmitted via the second antenna 534 to a distant user. Portions of the transmit signal may be picked up on the first antenna 514 (or another antenna). However, the second filter 530 has reduced the energy (i.e., conditioned) of the frequency components of the transmit signal far from the edge of the first frequency band (e.g., the 5 GHz band) to be below the noise floor, and the second NCC 532 has eliminated (i.e., conditioned) portions (near the upper edge of the first frequency band—e.g., the 5 GHz band close to the 6 GHz band) of the transmit signal that would have been above the noise floor such that said signal portions will now be below the noise floor of the first frequency band. As a result, since the portions of the transmit signal that would have raised the noise floor of the first frequency band have been conditioned and/or eliminated by the second filter 530 and the second NCC 532, the transmit signal will no longer interfere with the receive signal and/or first frequency band.

FIG. 5B illustrates the RF front end 500 in a receive mode of operation according to an example. FIG. 5B is identical to FIG. 5A except that the first FEM 502 is now transmitting the transmit signal, the second FEM 522 is now receiving a receive signal, and the summing nodes have changed location. The summing nodes 508, 528 of FIG. 5A are not shown, and instead a third summing node 509 and fourth summing node 529 are shown. The third summing node 509 is coupled between the first antenna 514 and the first filter 510 and first NCC 512. The fourth summing node 529 is coupled between the second switch S2 and the second filter 530 and the second NCC 532. Finally, the first and second switches S1, S2 have been switched such that the first transmit node 506 is indirectly coupled to the first antenna 514 and the second receive node 524 is indirectly coupled to the second antenna 534.

In the receive mode of operation, the transmit signal (now transmitted by the first FEM 502 via the first antenna 514) acts as a signal jammer (specifically, an out-of-band jammer) to the second FEM 522. For example, assuming again that the first frequency band of the first FEM 502 is the 5 GHz frequency band, and the second frequency band of the second FEM 522 is the 6 GHz frequency band (as shown, for example, in FIGS. 2 and 3), then the transmit signal operates like a large signal being received by the second section 522. In particular, the large transmit signal from antenna 514 that leaks into receive antenna 534 may cause the LNA 524 to be overdriven, resulting in non-linear operation. If the LNA 524 operates in a non-linear range, it will distort the received signal, and the throughput of the system will be reduced.

However, unlike in the transmit mode case of FIG. 5A, filtering the transmit signal on the transmit path (e.g., as it is transmitted by the first section 502) will not be effective, since the transmit signal must be passed by the filter 510 and must be radiated from antenna 514. Instead, it is necessary to filter the transmit signal that leaks into the receive antenna 534 on the receive path (e.g., between the second antenna 534 and the second switch S2. Among the advantages of filtering the transmit signal on the receive path is that filtering on the receive path will prevent distortion appearing on the LNA 524.

In operation, a transmit signal and/or a receive signal are received by the second antenna 534. The combined signals (referred to as the receive signal, for simplicity) are provided to the second filter 530 and second NCC 532. As with FIG. 5A, the second filter 530 passes the second frequency band (e.g., the 6 GHz band) and provides a predetermined amount of attenuation to the receive signal in the first frequency band (e.g., the 5 GHz band). The second NCC 532 samples portions of the receive signal corresponding to a given frequency band. Unlike in FIG. 5A, where the given frequency band was close-in to the edge of the frequency band, here the second NCC 532 has been programmed to provide a wider band of noise cancellation. The second NCC 532 can, for example, be programmed such that it provides attenuation across the entire first frequency band, or the middle half of the first frequency band, or any other section of the first frequency band or another frequency band.

The second NCC 532 adjusts the phase and/or amplitude of the sampled portion of the receive signal and produces an adjusted signal that is provided to the fourth summing node 529. As with FIG. 5B, the adjusted signal is added to the filtered signal from the second filter 530 to eliminate and/or condition (in a manner akin to destructive interference) the components of the filtered signal corresponding to the sampled portion of the receive signal. In some examples, this process reduces the components of the transmit signal sent on Transmit Antenna 514 and coupled onto Receive antenna 534 to a level low enough that the LNA 524 is not distorted by the OOB jammer Additionally, in some examples, there is a trade-off between the two modes of operation. In FIG. 5A, a great deal of attenuation is provided to the close-in edge of the first frequency band. In FIG. 5B, a moderate (and generally lesser) amount of attenuation is provided across a wider band of frequencies. Thus, as an example, in FIG. 5A the second NCC 532 acts in a manner similar to a band rejection filter, eliminating frequencies in a narrow band, whereas in FIG. 5B the second NCC 532 acts more like a high pass filter, rejecting frequencies below a certain frequency. However, while these examples contrast the operation of the filters, in some examples in both modes of operation the second NCC 532 acts like a band reject filter, with the general difference being that in the transmit mode of operation the reject band is narrower and the attenuation is relatively greater, and in the receive mode of operation the reject band is wider and the attenuation is relatively lesser.

Furthermore, either the first or second section 502, 522 can perform the above processes. When the first FEM 502 is in the transmit mode, it may effectively filter its transmit signal to remove undesirable components that would interfere with the receive signal on the second FEM 522. Likewise, the frequency bands discussed herein are purely illustrative. The first frequency band and second frequency bands may be any frequency bands. The various summing nodes may also not be any specialized hardware. Instead, the summing nodes may, in some examples, simply be the place where two or more conductors couple together (e.g., a fork between two or more wires).

FIG. 6 illustrates a graph of the filtering characteristics of the FEM 522 according to an example. The first axis 602 shows the attenuation provided by the filters 510, 530 and NCCs 512, 532 in decibels. The second axis 604 shows the frequency and the 5 GHz band 604*a* and 6 GHz band 604*b*. The first trace 606 shows the filtering provided by the filter 530 and NCC 532 in the transmit mode of operation (which is presumed, in this example, to be transmitting in the 6 GHz range while the FEM 502 is receiving in the 5 GHz range). The second trace 608 shows the filtering provided by the filter 530 and NCC 532 in the receive mode of operation (which is presumed, in this example, to be receiving in the 6 GHz range, while the FEM 502 is transmitting in the 5 GHz range).

The difference between the two traces 606, 608 is primarily due to adjusting the tap coefficients for phase and amplitude of the NCC 532. In the transmit mode of operation, the taps are chosen (e.g., programmed, for example by a digital controller or processor) to provide cancellation of the signals being transmitted on the 6 GHZ antenna near and just below the 6 GHZ frequency band. In the receive mode of operation, the taps are chosen to provide cancellation of the signals being received on the 6 GHz antenna throughout the 5 GHz frequency band.

Figure 7:
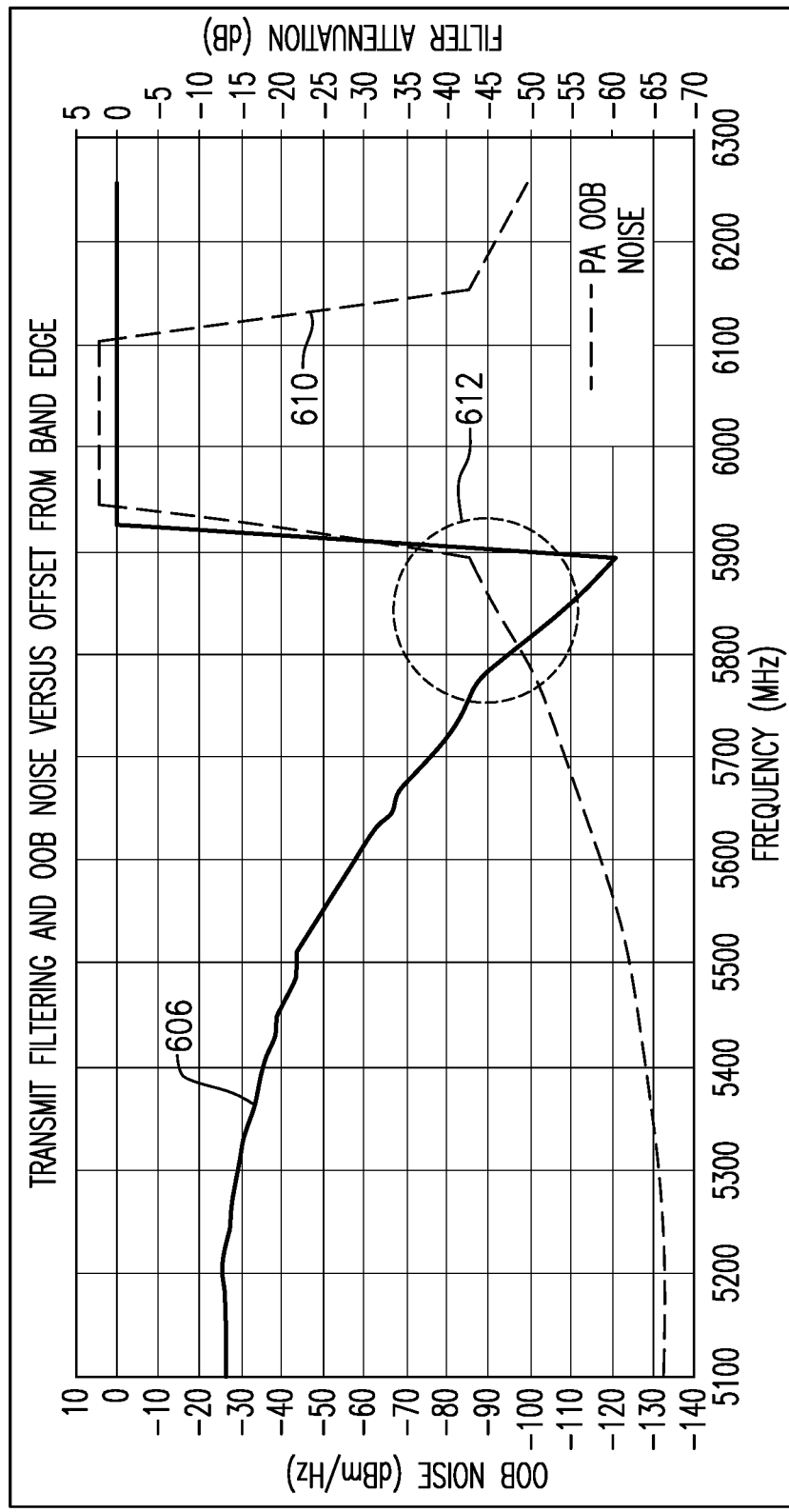
FIG. 7 illustrates a graph showing an overlay of a transmit signal with the effective filtering of the FEM in a transmit mode of operation according to an example.

FIG. 7 illustrates a graph showing an overlay of the transmit signal 610 from the second section 522 in transmit mode with the attenuation provided to the transmit signal 610 according to an example. The portion of the transmit signal 610 within the dotted circle 612 is subject to substantial attenuation, with the most conditioned portions of the transmit signal 610 within the dotted circle 612 being reduced by nearly 60 dB. As a result, the amount of energy present in the portion of the transmit signal 610 within the dotted circle 612 will be substantially less than it would be under the effects of an ordinary BAW filter. The attenuation, or effective filtering, of the transmit signal 610 can be considered the sum of the operation of the filter 510 and the noise cancellation circuit 512 operating to cancel undesirable portions of the transmit signal 610 picked up by the first antenna 514.

Figure 8:
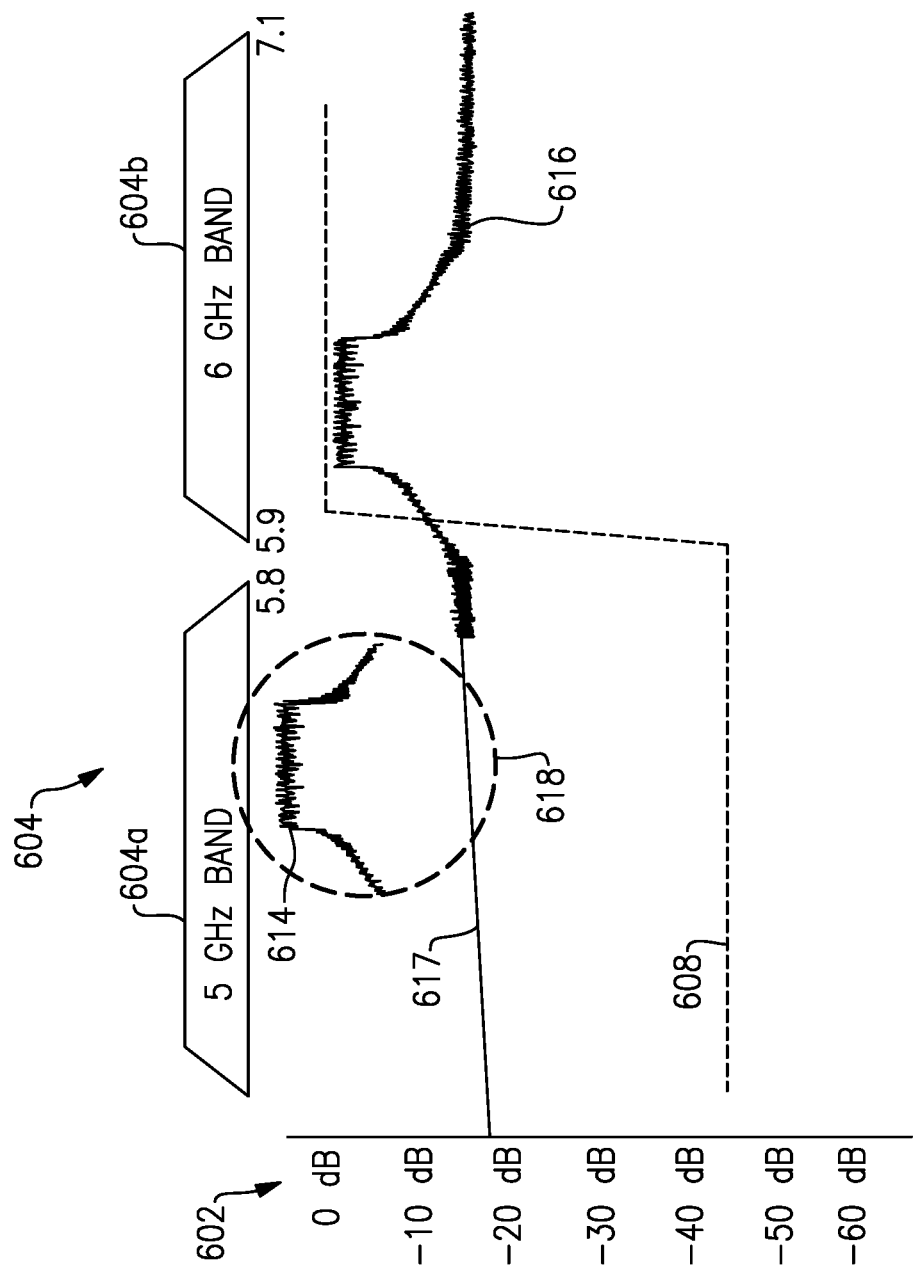
FIG. 8 illustrates a graph showing an overlay of the effective filtering of the FEM in a receive mode of operation according to an example.

FIG. 8 illustrates a graph where the second FEM 522 is in the receive mode of operation, the graph showing an overlay of the transmit signal 614 from the first section 502 and a receive signal 616 for the second section 522, in which attenuation is provided to the transmit signal 614 according to an example. In this figure, we show the receive signal arriving at the antenna 534, prior to the receive filter 530. As explained above, the transmit signal 614 from the first section 502 acts like a jammer for the receive signal 616. In particular, in the absence of filtering, the transmit signal 614 will be at a very high level, and this will cause the LNA 524 to operate in a non-linear manner. The second trace 608 shows the effective filtering from the receive filter, as a combination of the filtering of the filter 530 and the noise cancellation circuit 532 of the transmit signal 614 picked up by the second antenna 534. The portions of the transmit signal 614 within the dotted circle 618 will be conditioned— that is, the energy of the transmit signal 614 will be reduced from the perspective of the second section 522, such that the receive signal 616 can extend without obstruction to appear in the frequency bands the transmit signal 614 current blocks. Once the filtering depicted by trace 608 is applied, the jammer signal 614 is reduced to very low levels, and as a result the LNA 524 is able to operate in a linear operating range, and the overall receive operation is unaffected by the presence of the OOB jammer.

Figure 9:
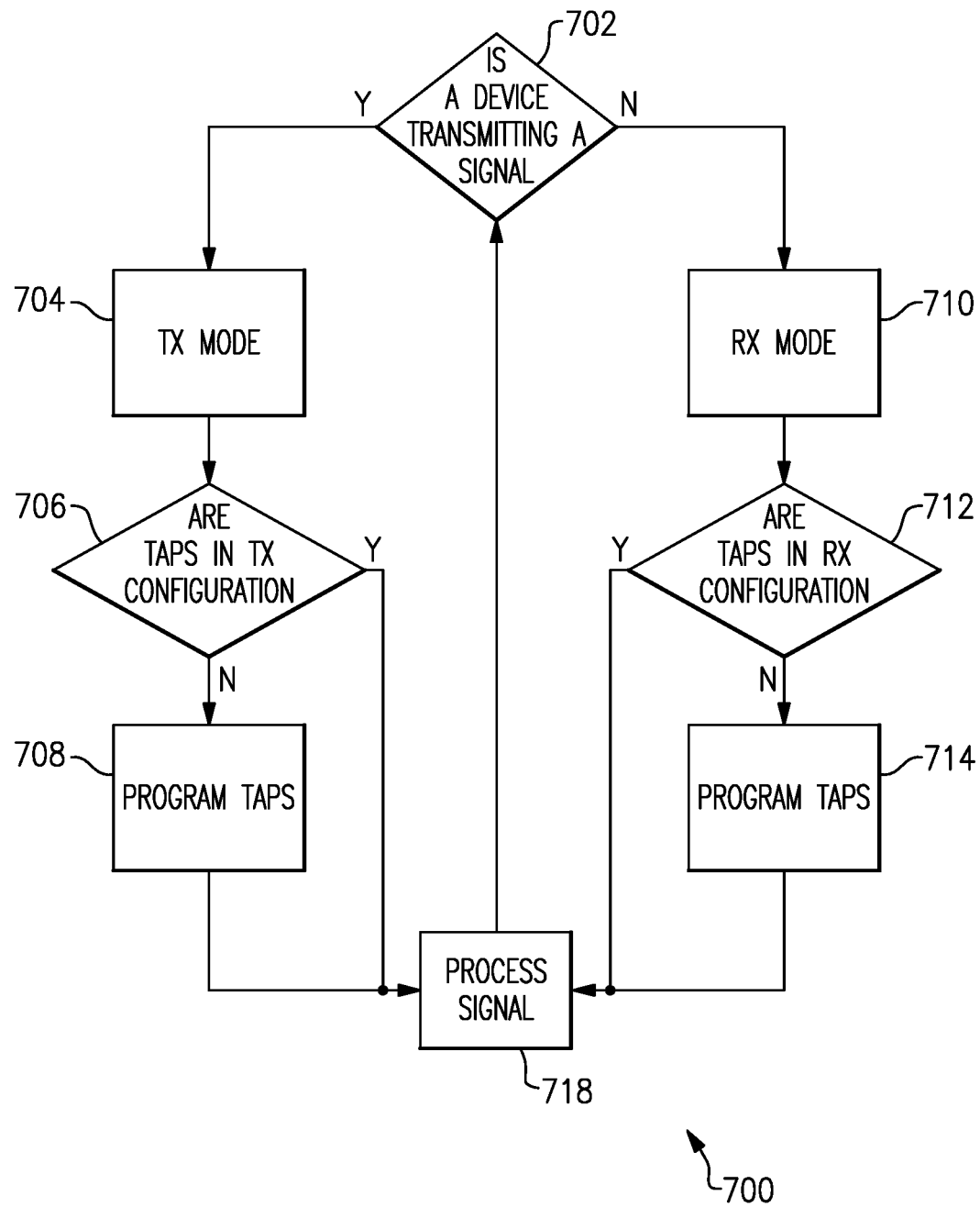
FIG. 9 illustrates a process for cancelling at least portions of a transmit signal received at a FEM according to an example.

FIG. 9 illustrates a process 700 for cancelling at least a portion of one or more transmit signals received at a section of an FEM.

At act 702, a controller determines whether an FEM is transmitting a transmit signal on a spectrum that the FEM is to share. The controller determines what frequency the transmit signal is being transmitted on, and can determine whether the transmit signal is likely to interfere with receive signals. Alternatively, the controller may determine that the FEM is transmitting on spectrum that other devices are or are likely to be receiving signals on. If the controller determines that the FEM is transmitting a signal (702Y), the process 700 proceeds to act 704. If the controller determines that the FEM is not transmitting a signal (702N), the process 700 proceeds to act 710.

At act 704, the controller sets the FEM to operate in transmit mode to accommodate transmission of the transmit signal. The process 700 then proceeds to act 706.

At act 706, the controller determines whether the taps (e.g., amplitude, frequency, phase taps, and so forth) of the FEM are configured for the transmit mode of operation. If the controller determines the taps are configured for the transmit mode of operation (706Y), the process 700 continues to act 718. If the controller determine that the taps are not configured for the transmit mode of operation (706N), the process 700 continues to act 708.

At act 708, the controller adjusts and/or sets the taps to values corresponding to the transmit mode of operation. This means the controller sets the taps to provide substantial attenuation near the edge of the receive frequency band, for example, as described with respect to FIG. 6 trace 606 or FIG. 7. The process 700 then proceeds to act 718.

Returning to act 710, at act 710 the controller sets the FEM to operate in receive mode to accommodate receiving a receive signal. The process 700 then proceeds to act 712.

At act 712, the controller determines whether the taps are configured for the receive mode of operation or not. If the controller determines the taps are configured for the receive mode of operation (712Y), the process 700 proceeds to act 718. If the controller determines the taps are not configured for the receive mode of operation (712N), the process 700 continues to act 714.

At act 714, the controller adjusts and/or sets the taps to values corresponding to the receive mode of operation. This means the controller sets the taps to provide moderate attenuation across the transmit frequency band, for example as described with respect to FIG. 6 trace 608 or FIG. 8. In some examples, the controller can determine the exact frequency and/or frequency band on which a signal is being transmitted. In such cases where the controller can determine the exact frequency and/or frequency band, the controller may program the taps to provide the desired level of rejection (e.g., noise cancellation) in the desired frequency band and/or sub-band. The process 700 then proceeds to act 718.

At act 718, the controller controls the FEM to process the signal. The controller may, for example, take the filtered and noise cancelled input signal and provide it to another device, perform various forms of post-processing on it, or use it for any other purpose. In some examples, the process 700 may then return to act 702 and repeat for future signals.

The ability to dynamically adjust a noise cancellation circuit, such as the first NCC 512 or the second NCC 532, during operation may not only be used to reduce interference between signals transmitted and received in adjacent frequency bands, but may be used to compensate or adjust for other real world issues. For example, during transmission, the circuitry involved in transmitting a signal, will heat up, with a change in temperature affecting a phase change of the transmit and/or receive signals. For example, a phase change of 30 degrees or more may be caused by a temperature change exceeding a threshold temperature amount. Such changes may be accounted for by dynamically changing the values of the taps for the noise cancellation circuit and/or filters to counteract the phase change or to further adjust the phase change to a desirable level. In some examples, the controller (for example the controller of process 700) may control the taps of the noise cancellation circuit of the FEM and/or the taps of the filter to adjust the phase change of the transmit and/or receive signal due to temperature variations or other real world issues.

In the foregoing examples, the RF front ends (e.g., RF front end 100 of FIG. 1) have typically been portrayed with two FEMs (e.g., the first and second FEMs 102, 122). However, the RF front ends depicted herein may have only a single FEM. That is, RF front end 100 of FIG. 1 may omit FEM 122 or FEM 102. In general, the RF front ends may have a single FEM or multiple FEMs (e.g., 2, 3, 5, 10, and so forth).

Controllers, such microprocessors, ASICs, FPGAs, and other circuits, may help to control and/or execute various operations discussed above. Using data stored in associated memory and/or storage, the controllers may, for example, control the operating mode of the FEMs discussed above. In some examples, the controllers may select to operate the FEM in a receive mode or a transmit mode with respect to one or more sections of the FEM. The controller may also provide support functions, for example, by enabling communication between the FEM and other devices on a network.

In some examples, one or more controllers ("controllers") also execute one or more instructions stored on one or more non-transitory computer-readable media, which the controllers may include and/or be coupled to, that may result in manipulated data. In some examples, the controllers may include one or more processors or other types of controllers. In one example, the controllers are or include at least one processor. In another example, the controllers perform at least a portion of the operations discussed above using an application-specific integrated circuit tailored to perform particular operations in addition to, or in lieu of, a general-purpose processor.

As illustrated by these examples, examples in accordance with the present disclosure may perform the operations described herein using many specific combinations of hardware and software and the disclosure is not limited to any particular combination of hardware and software components. Examples of the disclosure may include a computer-program product configured to execute methods, processes, and/or operations discussed above. The computer-program product may be, or include, one or more controllers and/or processors configured to execute instructions to perform methods, processes, and/or operations discussed above.

Having thus described several aspects of at least one embodiment, it is to be appreciated various alterations, modifications, and improvements will readily occur to those skilled in the art. Such alterations, modifications, and improvements are intended to be part of, and within the spirit and scope of, this disclosure. Accordingly, the foregoing description and drawings are by way of example only.

What is claimed is:

1. A front-end module (FEM) comprising:
   a first section including
      a first node,
      a second node,
      a first filter,
      a first switch coupled to the first node, a transmit path, and a receive path, the first switch being configured to selectively couple the first node to only one of the transmit path or receive path at a time; and
      a first noise cancellation circuit, the first filter and the first noise cancellation circuit being coupled in parallel with one-another between the first node and the second node, the first node being configured to provide a first electrical signal to the first filter and the first noise cancellation circuit, the first filter being configured to produce a first conditioned signal based on the first electrical signal, the first noise cancellation circuit being configured to produce a first cancellation signal based on the first electrical signal, and the second node being configured to receive the first conditioned signal and the first cancellation signal.

2. The FEM of claim 1 wherein the FEM further comprises a second section including:
   a third node;
   a fourth node;
   a second filter; and
   a second noise cancellation circuit, the second filter and the second noise cancellation circuit being coupled in parallel with one-another between the third node and the fourth node, the third node being configured to provide a second electrical signal to the second filter and the second noise cancellation circuit, the second filter being configured to produce a second conditioned signal based on the second electrical signal, the second noise cancellation circuit being configured to produce a second cancellation signal based on the second electrical signal, and the fourth node being configured to receive the second conditioned signal and the second cancellation signal.

3. The FEM of claim 2 wherein the first electrical signal corresponds to a first frequency band and the second electrical signal corresponds to a second frequency band.

4. The FEM of claim 2 wherein the first electrical signal corresponds to a 6 GHz frequency band, and the second electrical signal corresponds to a 5 GHz frequency band.

5. The FEM of claim 1 wherein the first noise cancellation circuit includes a plurality of dynamically programmable taps configured to determine the first cancellation signal.

6. The FEM of claim 1 wherein the first electrical signal has frequency components in a first frequency band and a second frequency band, and the first noise cancellation circuit produces the first electrical signal such that the first cancellation signal attenuates at least a portion of the frequency components in the second frequency band when summed together in the second node with the first conditioned signal.

7. The FEM of claim 1 further comprising:
   an antenna coupled to one of the first node or the second node; and
   a switch coupled to a different one of the first node or the second node than is coupled to the antenna.

8. The FEM of claim 7 wherein the first switch has a first terminal coupled to the receive path, a second terminal coupled to the transmit path, and a third terminal configured to be selectively coupled to only one of the first terminal and the second terminal at a time.

9. The FEM of claim 1 wherein the first electrical signal overlaps includes frequency components that overlap with a frequency band of a second electrical signal.

10. The FEM of claim 9 wherein the first noise cancellation circuit produces the first cancellation signal such that the first cancellation signal attenuates the frequency components that overlap with the frequency band of the second signal near an edge of the frequency band.

11. A front-end module (FEM) comprising:
    an input configured to transmit and receive wireless telecommunication signals;
    a filter coupled between the input and a transmit node and a receive node and configured to filter one or more of the wireless telecommunication signals;
    a noise cancellation circuit configured to provide noise cancellation to one or more of the wireless telecommunication signals, the noise cancellation circuit being coupled in parallel with the filter between the input and the transmit or receive node, and including a plurality of dynamically programmable taps that can be dynamically programmed to determine one or more frequency bands for which the noise cancellation circuit provides noise cancellation dependent upon whether the FEM is operating in a transmit mode of operation or a receive mode of operation, and further based on a proximity of the one or more frequency bands for which the noise cancellation circuit provides noise cancellation to a frequency band associated with the transmit mode of operation or the receive mode of operation;
    a first switch coupled between the transmit or receive node and a parallel combination of the noise cancellation circuit and the filter, the first switch being configured to selectively couple the parallel combination to only one of the transmit node or the receive node at a time; and
    a summing node coupled to the filter and the noise cancellation circuit, the summing node configured to sum an output of the filter and an output of the noise cancellation circuit.

12. The FEM of claim 11 wherein the FEM has a plurality of modes of operation including the transmit mode of operation and the receive mode of operation.

13. The FEM of claim 12 further comprising a controller configured to set one or more values of the dynamically programmable taps of the plurality of dynamically programmable taps.

14. The FEM of claim 13 wherein the controller is configured to set the one or more values of the dynamically programmable taps to a first set of values in the transmit mode of operation.

15. The FEM of claim 14 wherein setting the dynamically programmable taps to the first set of values corresponds to setting the noise cancellation circuit to cancel at least a portion of at least one signal occupying a subset of frequencies near an edge of the frequency band associated with the transmit mode of operation.

16. The FEM of claim 14 wherein the controller is configured to set the one or more values of the dynamically programmable taps to a second set of values in the receive mode of operation.

17. The FEM of claim 16 wherein setting the dynamically programmable taps to the second set of values corresponds to setting the noise cancellation circuit to cancel at least a portion of at least one signal occupying a subset of frequencies across the frequency band associated with the receive mode of operation.

18. A method of filtering signals in a wireless telecommunications device using time domain duplexing (TDD) comprising:
    transmitting, from a first front-end module ("first FEM"), a first signal on a first frequency band;
    receiving, at a second FEM, the first signal, the first signal having frequency components extending into a second frequency band;
    receiving, at the second FEM, a second signal on the second frequency band, and combining the second signal and the first signal to produce a combined signal;
    providing the combined signal to a filter of the second FEM, the filter configured to condition the combined signal to produce a conditioned signal;
    providing at least a portion of the combined signal to a noise cancellation circuit of the second FEM, the noise cancellation circuit having a plurality of dynamically programmable taps, the noise cancellation circuit being configured to adjust the at least a portion of the combined signal to produce an adjusted signal;
    dynamically programming the dynamically programmable taps to have values corresponding to a frequency of the first frequency band based on a proximity of the frequency of the at least a portion of the combined signal to the second frequency band; and
    summing the conditioned signal and the adjusted signal.

19. The method of claim 18 wherein providing the at least a portion of the combined signal to the noise cancellation circuit includes the at least a portion of the combined signal being within a first range of frequencies, the first range of frequencies being a subset of the frequencies of the first signal.

20. The method of claim 18 wherein adjusting the at least a portion of the combined signal includes at least one of altering a phase of the at least a portion of the combined signal or altering an amplitude of the at least a portion of the combined signal.

* * * * *